US011974169B2

(12) United States Patent
Dotto et al.

(10) Patent No.: US 11,974,169 B2
(45) Date of Patent: *Apr. 30, 2024

(54) DYNAMIC FACILITATION OF COMMUNICATIONS SERVICES

(71) Applicant: DISH Wireless L.L.C., Englewood, CO (US)

(72) Inventors: Scott Dotto, Denver, CO (US); Ankur Kumar, Highlands Ranch, CO (US); Swaroop Raju, Denver, CO (US); Nathan Hare, Denver, CO (US); Nereus Osric Edwin Lobo, Denver, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,190

(22) Filed: Nov. 9, 2022

(65) Prior Publication Data

US 2023/0064340 A1 Mar. 2, 2023

Related U.S. Application Data

(63) Continuation of application No. 17/158,820, filed on Jan. 26, 2021, now Pat. No. 11,582,648.

(51) Int. Cl.
*H04W 28/24* (2009.01)
*H04W 72/543* (2023.01)
*H04W 76/10* (2018.01)

(52) U.S. Cl.
CPC ......... *H04W 28/24* (2013.01); *H04W 72/543* (2023.01); *H04W 76/10* (2018.02)

(58) Field of Classification Search
CPC .... H04W 28/24; H04W 76/10; H04W 72/543
See application file for complete search history.

(56) References Cited

U.S. PATENT DOCUMENTS

| 9,867,046 | B2 * | 1/2018 | Schwarzapel | H04L 51/56 |
| 11,271,807 | B1 * | 3/2022 | Rothschild | H04L 41/0895 |
| 11,582,648 | B2 * | 2/2023 | Dotto | H04W 72/543 |
| 2006/0166668 | A1 | 7/2006 | Choi et al. | |

(Continued)

FOREIGN PATENT DOCUMENTS

| EP | 2807553 A1 | 12/2014 | | |
| WO | 0232181 A1 | 4/2002 | | |
| WO | WO-2021002826 A1 * | 1/2021 | ......... | B64C 39/024 |

OTHER PUBLICATIONS

International Search Report and Written Opinion, dated May 9, 2022, for International Application No. PCT/US2022/013360, 21 pages.

*Primary Examiner* — Chi H Pham
*Assistant Examiner* — Weibin Huang
(74) *Attorney, Agent, or Firm* — Seed IP Law Group LLP

(57) ABSTRACT

Systems and methods for facilitating communicative connection for a user device are disclosed. Based on a request for communicative connection, a communication facilitator identifies a set of candidate communications service providers (CSPs) to match the request, provides information regarding the set of candidate CSPs to the user device, receives an indication of selection, and causes establishment of communicative connection for the user device via a communications service provided by the selected CSP.

20 Claims, 4 Drawing Sheets

(56) References Cited

U.S. PATENT DOCUMENTS

| | | | | |
|---|---|---|---|---|
| 2009/0103454 | A1* | 4/2009 | Watanabe | H04L 47/70 |
| | | | | 370/254 |
| 2012/0087377 | A1* | 4/2012 | Lai | H04L 45/04 |
| | | | | 370/427 |
| 2016/0301580 | A1* | 10/2016 | Li | H04W 24/06 |
| 2020/0053071 | A1* | 2/2020 | Akkaraju | H04L 65/612 |
| 2021/0022197 | A1* | 1/2021 | Chiang | H04W 76/19 |

* cited by examiner

DYNAMIC FACILITATION OF COMMUNICATIONS SERVICES

BACKGROUND

Technical Field

The present disclosure relates generally to facilitating communications services, and more specifically to facilitating user devices' communicative connections via services provided by communications service providers.

Description of the Related Art

A communications service provider (CSP) generally provides services to transport information electronically. It can involve the telecommunications (e.g., landline and wireless), Internet, cable, satellite, and managed services businesses. A CSP can offer telecommunications, media, entertainment, applications, and other information-related services, e.g., over a physical network. Examples of CSP can include Internet service providers (ISPs), cable companies, mobile carriers, television broadcasting operators, and others. User devices (e.g., a smart phone) typically access network utilities (e.g., by connecting to Internet content providers) via a pre-configured service provided by a particular CSP.

BRIEF DESCRIPTION OF THE SEVERAL VIEWS OF THE DRAWINGS

The present disclosure will be more fully understood by reference to the following figures, which are for illustrative purposes only. The figures are not necessarily drawn to scale, and elements of similar structures or functions are generally represented by like reference numerals for illustrative purposes throughout the figures. The figures do not describe every aspect of the teachings disclosed herein, and do not limit the scope of the claims.

DETAILED DESCRIPTION

Figure 1:
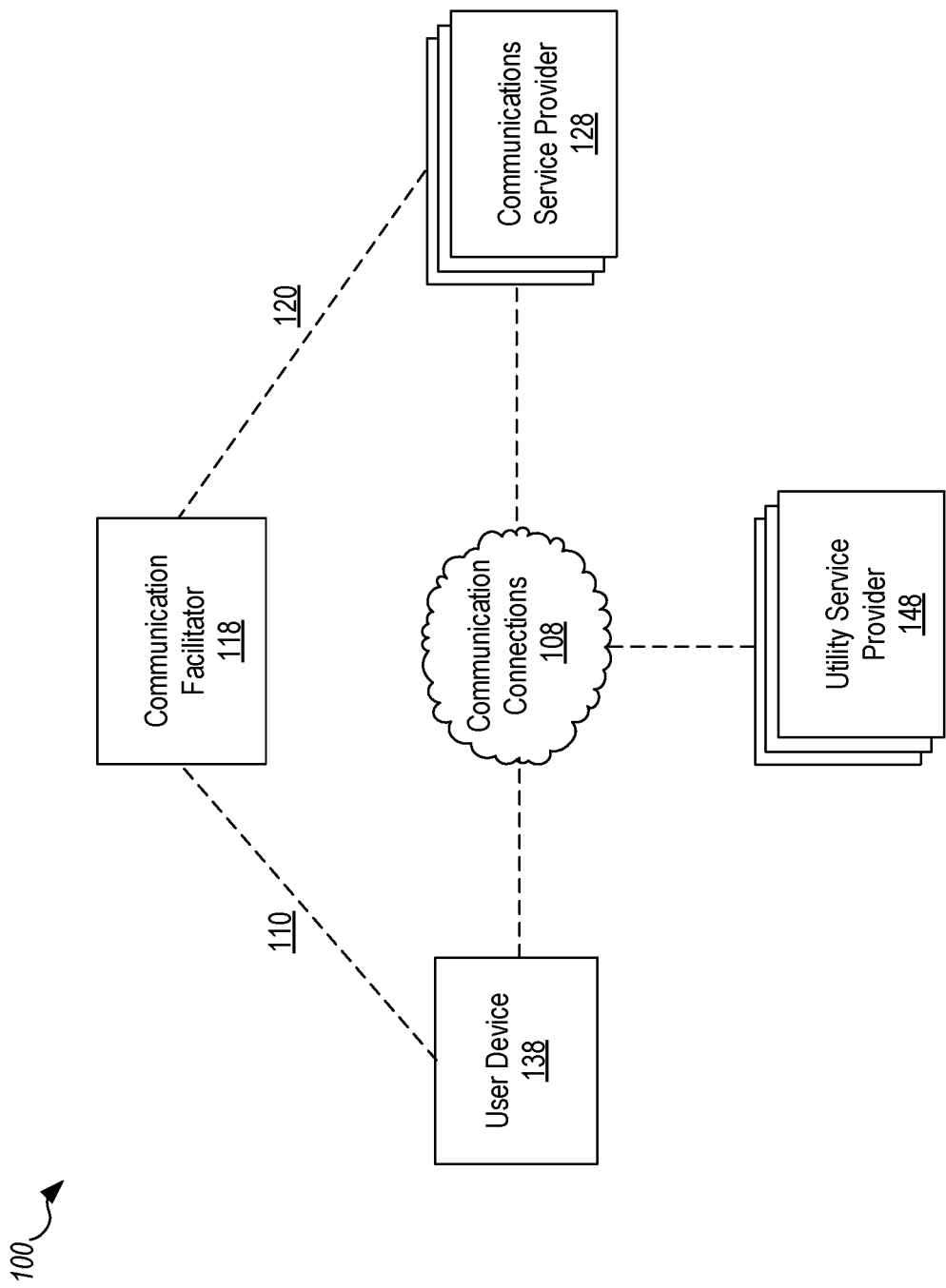
FIG. 1 is a block diagram illustrating an example networked environment for facilitating communications services in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Each of the features and teachings disclosed herein may be utilized separately or in conjunction with other features and disclosure to provide a system and method for dynamically facilitating communicative connections for user devices via services provided by multiple CSPs. Representative examples utilizing many of these additional features and teachings, both separately and in combination, are described in further detail with reference to the attached FIGS. 1-4. This detailed description is intended to teach a person of skill in the art further details for practicing aspects of the present disclosure, and is not intended to limit the scope of the claims. Therefore, combinations of features disclosed above in the detailed description may not be necessary to practice the teachings in the broadest sense, and are instead disclosed merely to describe particularly representative examples of the present disclosure.

In the description below, for purposes of explanation only, specific nomenclature is set forth to provide a thorough understanding of the system and method for achieving an intermediary for facilitating and managing communicative connections for a user device. However, it will be apparent to one skilled in the art that these specific details are not required to practice the teachings of the current disclosure. Also, other methods and systems may also be used.

Communications service providers (CSPs) typically strive to meet the demands and concerns of its customers, but this is becoming more difficult to do as new technologies, new content, and other network utilities continue to expand. For example, with the explosive growth in cloud-application usage, mobile devices, and extending connectivity and computing to the edge with 5G, pre-configured communication service for user devices via a particular CSP can be too rigid and inflexible, which may not keep up with the dynamic nature of user devices' demand for capacity and throughput. Accordingly, there is a need for improvement in the facilitation and management of services provided by CSPs.

The present disclosure relates generally to facilitating communications services, and more specifically to facilitating a user device's communicative connection via selective management of services provided by multiple CSPs. In some embodiments, a communication facilitator facilitates communicative connection(s) for a user device. In some embodiments, the communication facilitator can communicate with the user device independent of the CSPs under management (e.g., via a dedicated communication channel). The user device can determine a need for communicative connection based, e.g., on invocation of an application which requires or has a preference for certain type of communicative connection.

After receiving a request for the communicative connection from the user device, the communication facilitator identifies a set of candidate CSPs to match the request. In some embodiments, the request for communicative connection can indicate a communication purpose (e.g., gaming, audio or video streaming, web browsing, texting, audio or video chatting, or audio or video conferencing) and/or a destination utility service provider (e.g., an Internet content provider) that the user device intends to connect with. In some embodiments, the user device converts the need for communication connection into a set of communication criteria (e.g., latency requirement, bandwidth requirement, consistency requirement, duration requirement, channel requirement, interference requirement, and/or privacy requirement) prior to sending the request and includes at least some of the criteria in the request.

In some embodiments, the communication facilitator (e.g., instead of the user device) converts the request into a set of communication criteria in order to identify the set of candidate CSPs. The communication facilitator can obtain communication performance data from the CSPs under management as a basis for identifying the set of candidate CSPs. This can be performed periodically or as triggered by data updating events. Given the communication performance data, the communication facilitator can identify CSPs that satisfy applicable communication criteria.

In some embodiments, the communication facilitator provides information regarding the set of candidate CSPs to the user device and receives indication of a selected or approved CSP. In some embodiments, the communication facilitator makes the selection or approval itself. The selection and/or approval can be based on one or more selection criteria including monetary cost requirement, communication performance requirement, and/or user preference. As part of the basis for selection, the communication facilitator obtains pricing data from the CSPs for different communications services provided by them. The communication facilitator then communicates with the user device to establish the communicative connection via a communications service provided by the selected CSP, e.g., to access service(s) provided by a destination utility service provider.

FIG. 1 is a block diagram illustrating an example networked environment 100 for facilitating communications services in accordance with some embodiments of the techniques described herein. The networked environment 100 includes a communication facilitator 118, one or more CSPs 128, a user device 138, and one or more network utility service providers 148. The user device 138 can be connected to utility service provider(s) 148 via at least some part of communication connections 108, which are at least partially subject to control by CSP(s) 128. Additionally, the communication facilitator 118 is communicatively connected to the user device 138 and the CSP(s) 128 via connections 110 and 120 (e.g., dedicated communication channels). In some embodiments, the connections 110 and/or 120 are part of the communication connections 108.

In the depicted networked environment 100, the communication connections 108 may comprise one or more computer networks, one or more wired or wireless networks, satellite transmission media, one or more cellular networks, or some combination thereof. The communication connections 108 may include a publicly accessible network of linked networks, possibly operated by various distinct parties, such as the Internet. The communication connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the communication connections 108 may include various types of wired and/or wireless networks in various situations, including satellite transmission. In addition, the communication connections 108 may include one or more communication interfaces to individual entities in the networked environment 100, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like. The battery charging connection 110 may include wired and/or wireless charging interfaces, for example, based on Programmable Power Supply, USB, and/or Qi technologies. In some embodiments, the battery charging connection 110 is part of the communication connections 108.

In various embodiments, examples of a user device 138 include, but are not limited to, one or a combination of the following: a "computer," "mobile device," "gaming console," "tablet computer," "smart phone," "handheld computer," and/or "workstation," etc. The user device(s) 138 may be any suitable computing device or electronic equipment that, e.g., is able to communicate with the communication facilitator 118 and the utility service provider(s) 148.

In various embodiments, the communication facilitator 118 can include one or more computing devices for performing the communication facilitating functions described herein. The communication facilitator 118 can include functional units for processing requests from user devices, obtaining performance and pricing data from CSPs, matching and selecting CSPs and associated communications services, as well as facilitating establishment of communicative connections between user devices and utility service providers based thereon. In various embodiments, individual CSPs 128 and utility service providers 148 can be implemented in software and/or hardware form on one or more computing devices including a "computer," "mobile device," "tablet computer," "smart phone," "handheld computer," "server," and/or "workstation," etc. The utility service provider(s) 148 can provide content, service, forum, and/or other network utilities.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Figure 2:
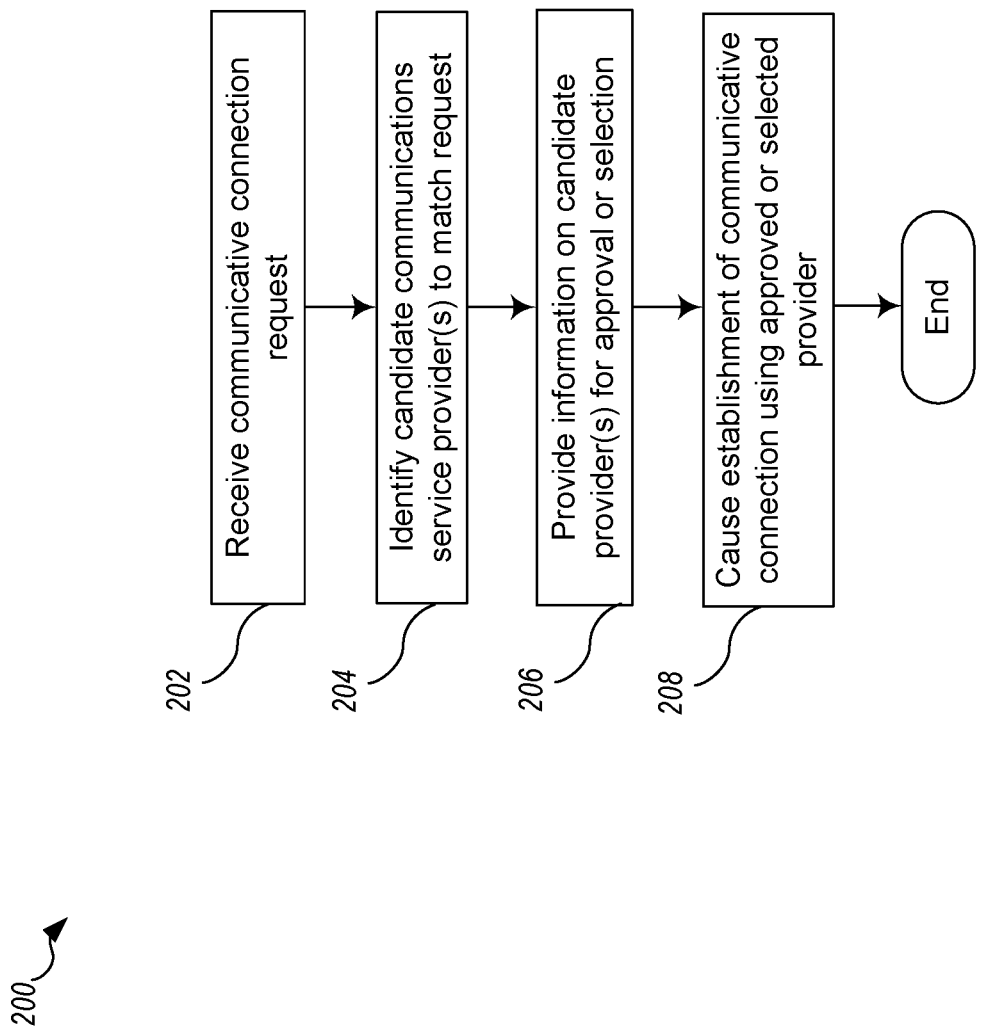
FIG. 2 is a flow diagram depicting an example process for facilitating communications services in accordance with some embodiments of the techniques described herein.

FIG. 2 is a flow diagram depicting an example process 200 for facilitating communications services in accordance with some embodiments of the techniques described herein. In various embodiments, the process 200 is performed in real time, and at least some part of the process 200 is performed in a transparent manner to a user of the user device. Illustratively, at least some part of the process 200 can be implemented by the communication facilitator 118 of FIG. 1.

The process 200 starts at block 202, which includes receiving a request from a user device 138 for communicative connection(s). The request can include a communication purpose, a utility service provider that the user device is about to access, one or more communication criteria for the communicative connection(s), one or more selection criteria for selecting CSP(s) and associated communication service(s), combinations of the same or the like. In some embodiments, the request includes system information and/or status of the user device (e.g., its model, configuration, computing power, storage capacity, communication capability, and/or active applications). In some embodiments, the request includes an obfuscated identifier of the user device. In some embodiments, the communication facilitator 118 validates the identity of the user device and/or its user in association with the request (e.g., the request is signed with an identify verifier of the user device and/or its user), so that the request can be processed and desired connectivity established for the right party.

In various embodiments, the communication facilitator 118 can receive such requests from multiple user devices concurrently or in a short time window (e.g., 1 second). The requests can be grouped based on various factors (e.g., geographic distance, network distance, communication purpose, destination utility service provider, and/or communication criteria). The grouped requests or individual request can be processed in real time.

At block 204, the process 200 includes identifying candidate CSP(s) to match the request. The communication facilitator 118 communicates with multiple CSPs to obtain performance, status, prediction, pricing, and/or service guarantee information associated with communications services provided by each CSP. This can be done periodically (e.g., every 5 minutes) or as triggered by new or updated information provided by individual CSPs. The communication facilitator 118 can establish and update a database with this information. In some embodiments, the communication facilitator 118 also determines or obtains information regarding establishment of communicative connections via different communications services provided by the CSPs (e.g., handover procedures associated with different services provided by individual CSPs) and include them in the database.

In some embodiments, the communication facilitator 118 converts the request into criteria and/or metrics that can be compared with the information regarding the communications services provided by different CSPs, and identifies a set of candidate CSPs providing service(s) that satisfy the criteria and/or metrics. In some embodiments, the communication facilitator 118 can further query CSP(s) for communications service related information for the comparison, confirmation, and/or data refreshments.

At block 206, the process 200 includes providing information regarding the set of candidate CSPs to the user device 138. In some embodiments, the communication facilitator 118 sends an indication of the set of candidate CSPs and associated communications services to the user device. In some embodiments, the communication facilitator 118 also sends pricing, performance, prediction, and/or service guarantee information about the different CSPs and associated communications services. In response, the communication facilitator 118 receives from the user device an indication of selected or approved CSP and associated service. In some embodiments, the block 206 is not performed and the communication facilitator 118 performs the selection/approval based on predetermined settings (e.g., selecting the cheapest communications service provided by a CSP in the set of candidates), the selection criteria included in the request, user or administrator preferences, combination of the same or the like.

At block 208, the process 200 includes causing establishment of communicative connection(s) using the selected or approved CSP service. Illustratively, the communication facilitator 118 communicates timing and procedures (e.g., for performing handover or adding a new communication channel) with the user device 138 and/or the selected or approved CSP to initiate the establishment process. In some embodiments, the communication facilitator 118 also communicates a time duration for the communicative connection and the procedures for the user device to revert back to current communicative connection(s).

Figure 3:
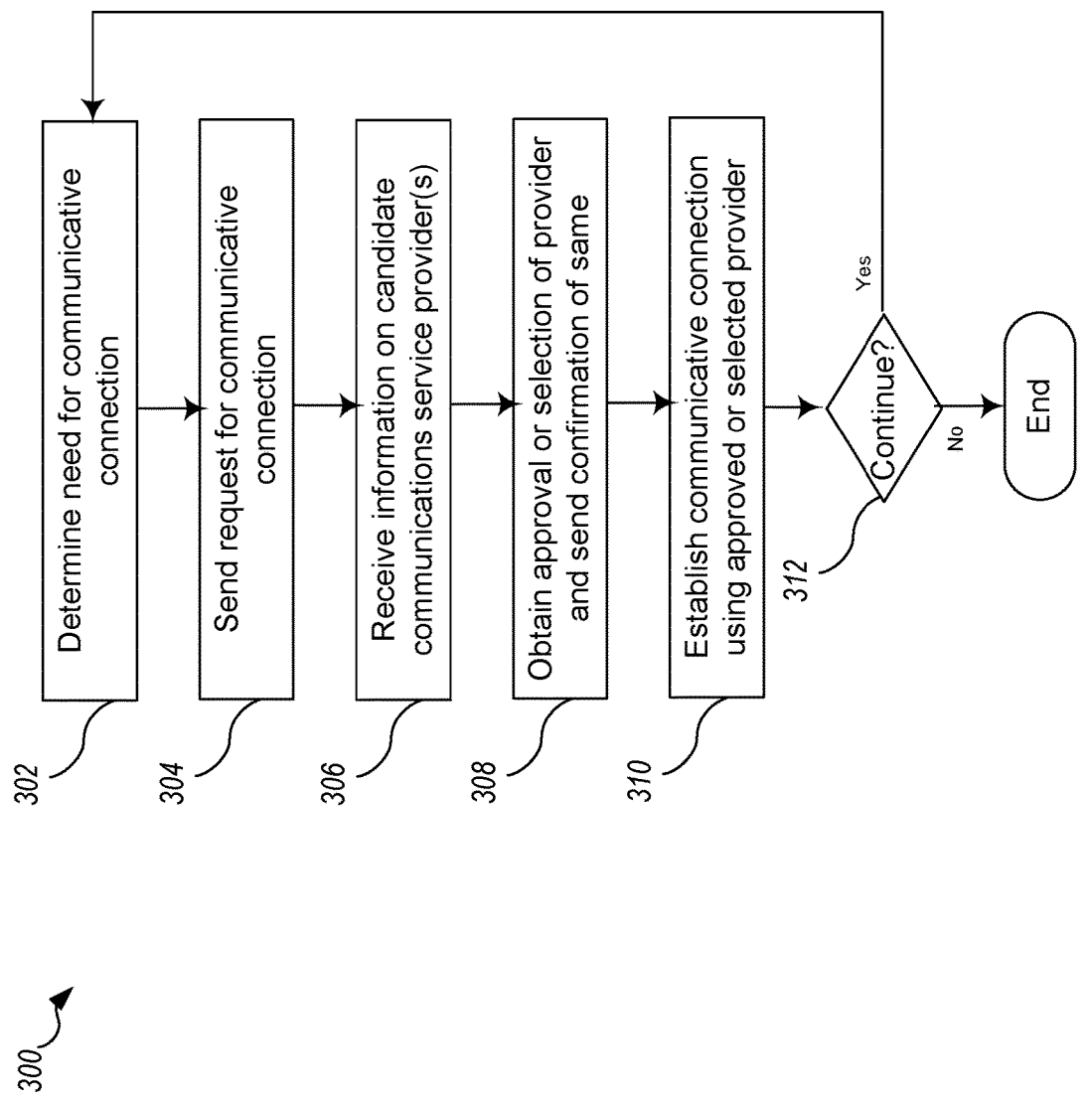
FIG. 3 is a flow diagram depicting an example process for requesting and establishing communicative connection(s) in accordance with some embodiments of the techniques described herein.

FIG. 3 is a flow diagram depicting an example process 300 for requesting and establishing communicative connection(s) in accordance with some embodiments of the techniques described herein. In various embodiments, the process 300 is performed in real time, and at least some part of the process 300 is performed in a transparent manner to a user of the user device. Illustratively, at least some part of the process 300 can be implemented by the user device 138 of FIG. 1.

The process 300 starts at block 302, which includes determining a need for communicative connection(s). Illustratively, the need for communicative connection(s) is based on invocation of an application on the user device 138. The invocation can trigger the user device 138 to analyze the capability and performance of the user device's current communicative connection(s), and determine whether the application can be adequately served or supported. In some embodiments, the user device 138 can convert the need for communicative connection into a set of communication criteria including latency requirement, bandwidth requirement, consistency requirement, duration requirement, channel requirement, interference requirement, privacy requirement, combinations of the same or the like.

At block 304, the process 300 includes sending a request for communicative connection(s) to the communication facilitator 118. As previously stated, the request can include a communication purpose, a utility service provider that the user device intends to access, one or more communication criteria for the communicative connection(s), one or more selection criteria for selecting CSP(s) and associated communication service(s), combinations of the same or the like. In some embodiments, the request includes system information and/or status of the user device (e.g., its model, configuration, computing power, storage capacity, communication capability, and/or active applications). In some embodiments, the request includes an obfuscated identifier of the user device. In some embodiments, information for validating the identity of the user device and/or its user is associated with the request (e.g., the request is signed with an identify verifier of the user device and/or its user), so that the request can be processed and desired connectivity established for the right party.

At block 306, the process 300 includes receiving information regarding a set of candidate CSPs as a response to the request. In some embodiments, the user device 138 receives an indication of the set of candidate CSPs and associated communications services. In some embodiments, the user device also receives pricing, performance, prediction, and/or service guarantee information about the different CSPs and associated communications services. The user device can present the CSP and service related information to a user.

At block 308, the process 300 includes obtaining a selection or approval of CSP and associated service, and sending confirmation of same to the communication facilitator 118. Illustratively, the selection or approval can be made by the user of the user device, or by the user device (e.g., based on predetermined or dynamically-generated rules) without user interactions. In some embodiments, blocks 306 and 308 are not performed as the communication facilitator selects or approves an appropriate CSP and associated communication service for the user device.

At block 310, the process 300 includes establishing communicative connection(s) using the selected or approved CSP service. Illustratively, the user device 138 receives timing and procedures (e.g., for performing handover or adding a new communication channel) from the communication facilitator 118 and/or the CSP to initiate the establishment process. In some embodiments, the user device 138 also receives indication of a time duration for the communicative connection and the procedures for the user device to revert back to current communicative connection(s), which the user device can perform accordingly.

At block 312, the process 300 includes determining whether to continue the process. If so, the process proceeds to block 302; otherwise, the process ends.

Those skilled in the art will appreciate that the various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
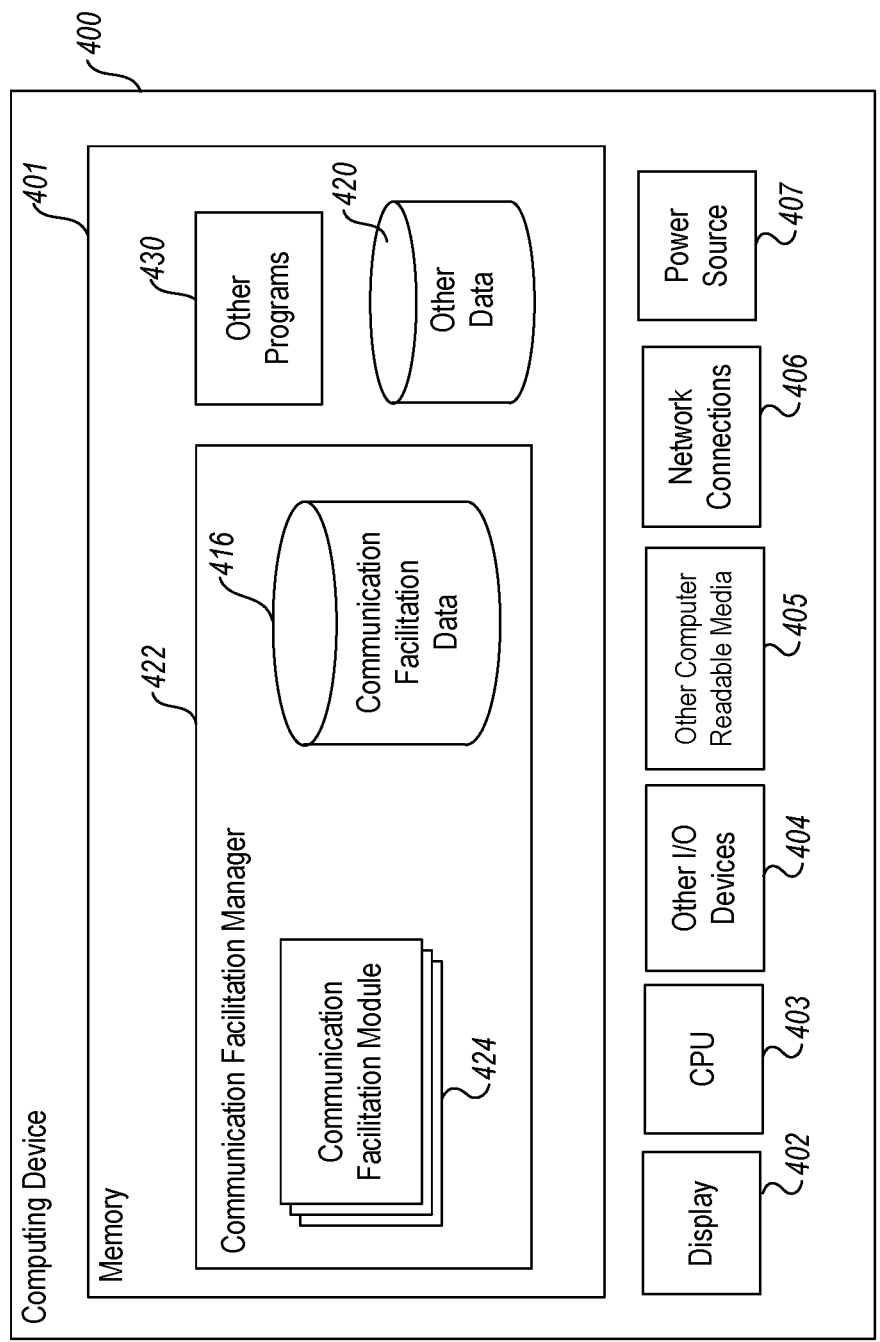
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a communication facilitator 118, user device 138, CSP 128, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the communication facilitation manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units ("CPU") 403, Input/Output ("I/O") devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The communication facilitation manager 422 is shown residing in memory 401. In other embodiments, some portion of the contents and some, or all, of the components of the communication facilitation manager 422 may be stored on and/or transmitted over the other computer-readable media 405. The components of the computing device 400 and communication facilitation manager 422 can execute on one or more CPUs 403 and implement applicable functions described herein. In some embodiments, the communication facilitation manager 422 may operate as, be part of, or work in conjunction and/or cooperation with other software applications stored in memory 401 or on various other computing devices. In some embodiments, the communication facilitation manager 422 also facilitates communication with peripheral devices via the I/O devices 404, or with another device or system via the network connections 406.

The one or more communication facilitation modules 424 is configured to perform actions related, directly or indirectly, to facilitating and managing communicative connections for user device(s) as described herein. In some embodiments, the communication facilitation module(s) 424 stores, retrieves, or otherwise accesses at least some communication facilitation-related data on some portion of the communication facilitation data storage 416 or other data storage internal or external to the computing device 400. In various embodiments, at least some of the communication facilitation modules 424 may be implemented in software or hardware.

Other code or programs 430 (e.g., further data processing modules, a program guide manager module, a Web server, and the like), and potentially other data repositories, such as data repository 420 for storing other data, may also reside in the memory 401, and can execute on one or more CPUs 403. For example, other code or programs 430 can include an identity/security module which can provide a unique identifier for the computing device 400 or otherwise facilitate validation of an identity of the computing device 400 and/or its user. Of note, one or more of the components in FIG. 4 may or may not be present in any specific implementation. For example, some embodiments may not provide other computer readable media 405 or a display 402.

In some embodiments, the computing device 400 and communication facilitation manager 422 include API(s) that provides programmatic access to add, remove, or change one or more functions of the computing device 400. In some embodiments, components/modules of the computing device 400 and communication facilitation manager 422 are implemented using standard programming techniques. For example, the communication facilitation manager 222 may be implemented as an executable running on the CPU 403, along with one or more static or dynamic libraries. In other embodiments, the computing device 400 and communication facilitation manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the communication facilitation manager 422. In some embodiments, instructions cause the CPU 403 or some other processor, such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a communication facilitation manager 422 implementation. Also, other functions could be implemented and/or performed by each component/module, and in different orders, and by different components/modules, yet still achieve the functions of the computing device 400 and communication facilitation manager 422.

In addition, programming interfaces to the data stored as part of the computing device 400 and communication facilitation manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The communication facilitation data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the communication facilitation manager 422.

Furthermore, in some embodiments, some or all of the components of the computing device 400 and communication facilitation manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for facilitating communicative connection for a user device, comprising:
   obtaining communication performance data from one or more communications service providers;
   identifying a set of candidate communications service providers that are capable of providing wireless communications service to the user device, to match a request for establishing a communicative connection for the user device based, at least in part, on the obtained communication performance data;

receiving an indication of a communications service provider selected from the set of candidate communications service providers; and causing establishment of the communicative connection for the user device via a communications service provided by the selected communications service provider.

2. The method of claim 1, wherein the request indicates a destination utility service provider different from the one or more communications service providers.

3. The method of claim 2, wherein the destination utility service provider includes at least one of a network content provider, network service provider, or network forum provider.

4. The method of claim 2, wherein causing establishment of the communication connection comprises enabling the user device to communicate with the destination utility service provider.

5. The method of claim 1, wherein the request indicates a communication purpose.

6. The method of claim 5, wherein the communication purpose includes at least one of gaming, audio or video streaming, web browsing, texting, audio or video chatting, or audio or video conferencing.

7. The method of claim 5, wherein causing establishment of the communication connection comprises enabling the user device to communicate in accordance with the communication purpose.

8. The method of claim 1, further comprising obtaining a set of communication criteria based, at least in part, on the request.

9. The method of claim 8, wherein the set of communication criteria includes at least one of latency requirement, bandwidth requirement, consistency requirement, duration requirement, channel requirement, interference requirement, or privacy requirement.

10. The method of claim 8, wherein identifying the set of candidate communications service providers to match the request further comprises identifying one or more communications services provided by at least one communications service provider that satisfy the set of communication performance criteria.

11. One or more non-transitory computer-readable media collectively storing contents that, when executed by one or more processors, cause actions to be performed, the actions comprising:

obtaining communication performance data from one or more communications service providers;

identifying a set of candidate communications service providers capable of providing wireless communications service to a user device, to match a request for establishing a communicative connection for the user device based, at least in part, on the obtained communication performance data; and causing establishment of the communicative connection for the user device via a communications service provided by a communications service provider selected from the set of candidate communications service providers.

12. The one or more non-transitory computer-readable media of claim 11, wherein the request indicates a destination utility service provider different from the one or more communications service providers.

13. The one or more non-transitory computer-readable media of claim 12, wherein causing establishment of the communication connection comprises enabling the user device to communicate with the destination utility service provider.

14. The one or more non-transitory computer-readable media of claim 11, wherein the actions further comprise obtaining a set of communication criteria based, at least in part, on the request.

15. The one or more non-transitory computer-readable media of claim 14, wherein identifying the set of candidate communications service providers to match the request further comprises identifying one or more communications services provided by at least one communications service provider that satisfy the set of communication criteria.

16. The one or more non-transitory computer-readable media of claim 11, wherein the communications service provider is selected from the set of candidate communications service providers based on at least one of a monetary cost requirement, communication performance requirement, or user preference.

17. A system, comprising:
one or more processors; and
memory storing contents that, when executed by the one or more processors, cause the system to:
identify a set of candidate communications service providers capable of providing wireless communications service to a user device, to match a request for establishing a communicative connection for the user device based, at least in part, on communication performance data obtained from one or more communications service providers;
receive an indication of a communications service provider selected from the set of candidate communications service providers; and
cause establishment of the communicative connection for the user device via a communications service provided by the selected communications service provider.

18. The system of claim 17, wherein the request is based, at least in part, on invocation of an application on the user device.

19. The system of claim 18, wherein the communication connection is associated with the application.

20. The system of claim 17, wherein the contents further cause deriving a set of communication criteria from the request.

* * * * *